(12) United States Patent
Belelie et al.

(10) Patent No.: US 9,228,101 B2
(45) Date of Patent: *Jan. 5, 2016

(54) RAPIDLY CRYSTALLIZING PHASE CHANGE INKS AND METHODS FOR FORMING THE SAME

(75) Inventors: Jennifer L. Belelie, Oakville (CA); Daryl W. Vanbesien, Burlington (CA); Gabriel Iftime, Mississauga (CA); Corey L. Tracy, Calgary (CA); Nathan M. Bamsey, Burlington (CA); Caroline M. Turek, Mississauga (CA); Naveen Chopra, Oakville (CA); Kentaro Morimitsu, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/456,679

(22) Filed: Apr. 26, 2012

(65) Prior Publication Data
US 2013/0284055 A1    Oct. 31, 2013

(51) Int. Cl.
*C09D 11/02* (2014.01)
*C09D 11/34* (2014.01)
*C09D 11/322* (2014.01)

(52) U.S. Cl.
CPC ............ *C09D 11/34* (2013.01); *C09D 11/322* (2013.01)

(58) Field of Classification Search
CPC ....................................... C09D 11/34
USPC ............................ 106/31.29, 31.61
See application file for complete search history.

(56) References Cited

U.S. PATENT DOCUMENTS

| | | |
|---|---|---|
| 4,490,731 A | 12/1984 | Vaught |
| 5,195,430 A | 3/1993 | Rise |
| 5,231,135 A | 7/1993 | Machell |
| 5,389,958 A | 2/1995 | Bui |
| 5,421,868 A * | 6/1995 | Ayalia-Esquilin et al. 106/31.29 |
| 5,621,022 A | 4/1997 | Jaegar |
| 5,922,117 A * | 7/1999 | Malhotra et al. ........... 106/31.58 |
| 6,221,137 B1 | 4/2001 | King |
| 7,186,762 B2 | 3/2007 | Wong |
| 8,328,924 B2 * | 12/2012 | Morimitsu et al. ........ 106/31.29 |
| 8,753,441 B2 * | 6/2014 | Vanbesien et al. ......... 106/31.29 |
| 2010/0190904 A1 * | 7/2010 | Wong et al. .................. 524/275 |
| 2012/0272862 A1 * | 11/2012 | Chopra et al. ............. 106/31.61 |
| 2012/0272864 A1 * | 11/2012 | Morimitsu et al. ........ 106/31.61 |
| 2012/0274713 A1 * | 11/2012 | Odell et al. ..................... 347/99 |

OTHER PUBLICATIONS

Morimitsu, et al., U.S. Appl. No. 13/457,323, filed Apr. 26, 2012.
Morimitsu, et al., U.S. Appl. No. 13/457,300, filed Apr. 26, 2012.
Iftime, et al., U.S. Appl. No. 13/457,271, filed Apr. 26, 2012.
Morimitsu, et al., U.S. Appl. No. 13/457,221, filed Apr. 26, 2012.

(Continued)

*Primary Examiner* — Veronica F Faison
(74) *Attorney, Agent, or Firm* — Pillsbury Winthrop Shaw Pittman LLP (57) ABSTRACT

A solid ink composition suitable for ink jet printing, including printing on coated paper substrates. In embodiments, the solid ink composition comprises both a crystalline compound and an amorphous compound, and optionally, in combination, an organic pigment, which provides for a robust, rapid crystallization ink composition.

18 Claims, 4 Drawing Sheets

(56) References Cited

OTHER PUBLICATIONS

Iftime, et al., U.S. Appl. No. 13/457,157, filed Apr. 26, 2012.
Morimitsu, et al., U.S. Appl. No. 13/457,068, filed Apr. 26, 2012.
Vanbesien, et al., U.S. Appl. No. 13/456,993, filed Apr. 26, 2012.
Mormitsu, et al., U.S. Appl. No. 13/456,916, filed Apr. 26, 2012.
Iftime, et al., U.S. Appl. No. 13/456,847, filed Apr. 26, 2012.
Belelie, et al. U.S. Appl. No. 13/456,805, filed Apr. 26, 2012.
Morimitsu, et al., U.S. Appl. No. 113/095,795, filed Apr. 27, 2012.
Iftime, et al., U.S. Appl. No. 13/456,722, filed Apr. 26, 2012.
Chopra, et al., U.S. Appl. No. 13/456,619, filed Apr. 26, 2012.
Belelie, et al., U.S. Appl. No. 13/095,636, filed Apr. 27, 2012.
Chopra, et al., U.S. Appl. No. 13/095,555, filed Apr. 27, 2012.

\* cited by examiner

AMORPHOUS COMPOUND

*FIG. 5A*

CRYSTALLINE COMPOUND

*FIG. 5B*

RAPIDLY CRYSTALLIZING PHASE CHANGE INKS AND METHODS FOR FORMING THE SAME

CROSS-REFERENCE TO RELATED APPLICATIONS

Reference is made to commonly owned and co-pending, U.S. patent application Ser. No. 13/456,619 entitled "Phase Change Ink Compositions Comprising Crystalline Diurethanes And Derivatives Thereof" to Naveen Chopra et al., electronically filed on the same day herewith U.S. patent application Ser. No. 13/457,323 entitled "Phase Change Ink Compositions Comprising Crystalline Sulfone Compounds and Derivatives Thereof" to Kentaro Morimitsu et al., electronically filed on the same day herewith; U.S. patent application Ser. No. 13/457,221 entitled "Phase Change Inks Comprising Crystalline Amides" to Kentaro Morimitsu et al., electronically filed on the same day herewith; U.S. patent application Ser. No. 13/456,916 entitled "Phase Change Ink Compositions Comprising Aromatic Ethers" to Kentaro Morimitsu et al., electronically filed on the same day herewith; U.S. patent application Ser. No. 13/457,157 entitled "Fast Crystallizing crystalline-amorphous ink compositions and methods for making the same" to Gabriel Iftime et al., electronically filed on the same day herewith; U.S. patent application Ser. No. 13/456,805 entitled "Phase Change Inks Comprising Organic Pigments" to Jennifer Belelie et al., electronically filed on the same day herewith; U.S. patent application Ser. No. 13/457,271 entitled "Rapid Solidifying Crystalline-Amorphous Inks" to Gabriel Iftime et al., electronically filed on the same day herewith; U.S. patent application Ser. No. 13/456,993 entitled "Phase Change Inks Comprising Inorganic Nucleating Agents" to Daryl W. Vanbesien et al., electronically filed on the same day herewith; U.S. patent application Ser. No. 13/456,722 entitled "Phase Change Inks Comprising Fatty Acids" to Gabriel Iftime et al., electronically filed on the same day herewith; U.S. patent application Ser. No. 13/457,300 entitled "Phase Change Inks Comprising Aromatic Diester Crystalline Compounds" to Kentaro Morimitsu et al., electronically filed on the same day herewith; U.S. patent application Ser. No. 13/457,068 entitled "Phase Change Ink Compositions Comprising Diurethanes as Amorphous Materials" to Naveen Chopra et al., electronically filed on the same day herewith; and U.S. patent application Ser. No. 13/456,847 entitled "TROM Process for Measuring the Rate of Crystallization of Solid Inks" to Gabriel Iftime et al., electronically filed on the same day herewith the entire disclosures of which are incorporated herein by reference in its entirety.

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to a novel solid ink composition comprising an amorphous compound, a crystalline compound, and optionally a colorant, and methods of making the same. The specific formulations described herein, including a combination of an amorphous compound and crystalline compound which have low compatibility, provide fast crystallizing ink compositions that forming high quality images or printing on coated paper substrates.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In piezo ink jet printing processes employing hot melt inks, the solid ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks" or "solid inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional solid ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for solid ink compositions and future printing technologies to provide customers with excellent image quality on all substrates. There is further a need to provide such phase change ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel solid ink compositions comprising an amorphous and crystalline material with limited compatibility, and an organic pigment, which are suitable for ink jet high speed printing, such as printing on coated paper substrates. In particular, the phase change ink crystallizes faster from the liquid state than the same composition without either the organic pigment or the amorphous and crystalline components (the amorphous and crystalline components having limited compatibility).

In particular, the present embodiments provide a phase change ink comprising: an amorphous compound comprising an amorphous core moiety having at least one functional group and being attached to at least one amorphous terminal group, wherein the amorphous terminal group comprises an alkyl group, wherein the alkyl is straight, branched or cyclic, saturated or unsaturated, substituted or unsubstituted, having from about 1 to about 16 carbon atoms; a crystalline compound comprising a crystalline core moiety having at least one functional group and being attached to at least one crystalline terminal group, wherein the crystalline terminal group comprises an aromatic group; an organic pigment; and an optional dye colorant, wherein no one functional group in the amorphous core moiety is the same as any of the functional group of the crystalline core moiety.

In further embodiments, there is provided a phase change ink comprising: an amorphous compound selected from the group consisting of an ester of tartaric acid of Formula I:

Formula I an ester of citric acid of Formula II:

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 16 carbon atoms, and mixtures thereof; a crystalline compound comprises a crystalline core moiety having at least one functional group and being attached to at least one crystalline terminal group, wherein no one functional group is —OH; and an organic pigment, wherein the total crystallization time of the phase change ink is no longer than about 5 times that the total crystallization time of the crystalline compound alone.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

It was previously discovered that using a mixture of crystalline and amorphous small molecule compounds in phase change ink formulations provides robust inks, and in particular, phase change inks which demonstrate robust images on coated paper, as disclosed in U.S. patent application Ser. No. 13/095,636 to Jennifer L. Belelie et al. filed Apr. 27, 2011, and hereby incorporated by reference in its entirety. Print samples made with such phase change inks demonstrate better robustness with respect to scratch, fold, and fold offset as compared to currently available phase change inks.

However, the present inventors discovered that in many cases, mixtures that comprise crystalline and amorphous materials with or without dye colorant solidify slowly when printed on substrates from a molten state. Such slow solidifying inks are not suitable for high speed printing environments, like for example production printing, where printing at speeds higher than 100 feet per minute is required. Solidification of the ink is due to crystallization of the crystalline ink component when cooling.

The present inventors have also found that fast crystallization of a composition made of a crystalline and an amorphous component is not an inherent property of the composition. The rate of crystallization of the crystalline/amorphous mixture is a function of not only the crystalline and amorphous components independently, but even more importantly, is influenced by the selection of the pair of crystalline and amorphous materials. For example, a given crystalline component may provide a fast crystallizing composition when mixed with one amorphous component but the same crystalline component can result in a slow crystallizing composition when mixed with a different amorphous component. The relationship between the chemical structures of the pair of crystalline and amorphous components controls the rate of crystallization of a given mixture. However, there is no prior art describing how to select the pair of crystalline and amorphous components to provide fast crystallizing inks. These methods for providing fast crystallizing crystalline-amorphous inks are not known and there is thus a need for such methods.

The present inventors have discovered that using a mixture of crystalline and amorphous compounds in solid ink or phase change ink formulations provides robust inks, and in particular, solid inks which demonstrate robust images on coated paper.

The present embodiments provide a new type of ink jet solid ink composition which comprises a blend of (1) crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10, or is from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the solid inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

Figure 5A:
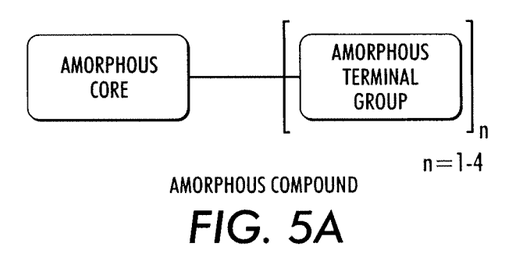
FIG. 5A is a diagram illustrating the structure of an amorphous compound made according to the present embodiments.
Figure 5B:
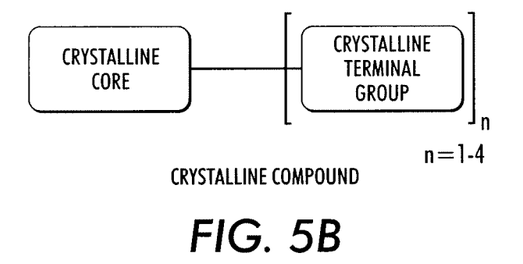
FIG. 5B is a diagram illustrating the structure of a crystalline compound made according to the present embodiments.

U.S. patent application Ser. No. 13/457,157 (not yet assigned) entitled "Fast Crystallizing Crystalline-Amorphous Ink Compositions and Methods for Making the Same" to Gabriel Iftime et al., electronically filed on the same day herewith discloses one method to achieve fast solidifying inks by using a composition wherein the crystalline and amorphous components have limited compatibility. By limited compatibility, it is meant that the two components have a tendency to quickly phase separate when cooled down from a molten state. Limited compatibility is achieved by selecting the crystalline and amorphous components such as to satisfy a set of design rules regarding the relationship between the functional groups present in the chemical structures of a selected pair of a crystalline and amorphous components respectively to provide the ability to rapidly crystallize. As disclosed in U.S. patent application Ser. No. 13/457,157 (not yet assigned) entitled "Fast Crystallizing Crystalline-Amorphous Ink Compositions and Methods for Making the Same" to Gabriel Iftime et al., electronically filed on the same day herewith, the design rules are set forth below:

(1) The phase change ink composition comprises an amorphous compound and a crystalline compound;

(2) The amorphous compound comprises an amorphous core moiety having at least one functional group and being attached to at least one amorphous terminal group, wherein the amorphous terminal group comprises an alkyl group, wherein the alkyl is straight, branched or cyclic, saturated or unsaturated, substituted or unsubstituted, having from about 1 to about 16 carbon atoms; a diagram showing the structure of an amorphous compound as shown in FIG. 5A;

(3) The crystalline compound comprises a crystalline core moiety having at least one functional group and being attached to at least one crystalline terminal group, wherein the crystalline terminal group comprises an aromatic group; a diagram showing the structure of a crystalline compound as shown in FIG. 5B; and (4) No one functional group in the amorphous core moiety is the same as any of the functional group of the crystalline core moiety.

In specific embodiments, the amorphous compound comprises an amorphous core moiety having the following structure:

and being attached to at least one amorphous terminal group and a crystalline compound comprising a crystalline core moiety having at least one functional group and being attached to at least one crystalline terminal group, wherein no one functional group is —OH.

U.S. patent application Ser. No. 13/456,805 (not yet assigned) entitled "Phase Change Inks Comprising Organic Pigments" to Jennifer Belelie et al., electronically filed on the same day herewith discloses a different method to achieve fast crystallizing inks, by using an organic pigment as a crystallization accelerator.

In the present disclosure, it has been discovered by the inventors that a combination of select crystalline and amorphous compounds with low compatibility and organic pigments provide a synergistic effect and achieved even faster crystallization than the above-mentioned methods. For example, in embodiments, a decrease by almost 65% was seen in crystallization time from use of the combination as compared to using either crystalline and amorphous compounds with low compatibility or organic pigments alone. By using the combination of the two approaches, a decrease in crystallization time was seen from about 25% to about 65%. In a specific embodiment, the combination reduced crystallization time from 14 seconds (for incompatible base components) and 7 seconds (pigment incorporation) down to 5 seconds for the combined use of both approaches.

Both colorless and dye-based inks formulated accordance with the above show fast crystallization. Such discovery demonstrates an important advancement for the ink design because the addition of a colorant, such as a dye, to mainline ink composition typically slows down the crystallization rate of the inks.

In order to evaluate the suitability of a test ink for fast printing, a quantitative method for measuring the rates of crystallization of phase change inks containing crystalline components was developed. Time-Resolved Optical Microscopy (TROM) provides comparison between various test samples and, as a result, is a useful tool for monitoring the progress made with respect to the design of fast crystallizing inks. TROM is described in U.S. patent application Ser. No. 13/456,847 (not yet assigned) entitled "TROM Process for Measuring the Rate of Crystallization of Solid Inks" to Gabriel Mime et al., electronically filed on the same day herewith.

Figure 1:
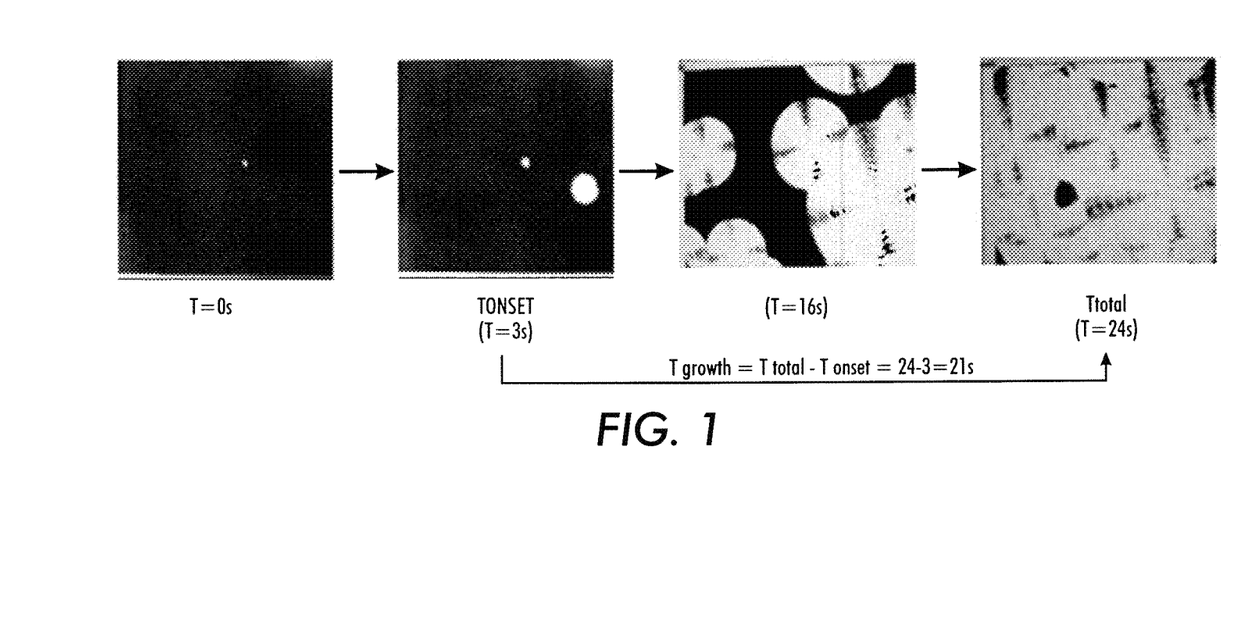
FIG. 1 illustrates the TROM process showing images of crystalline formation in an ink base from crystallization onset to crystallization completion according to the present embodiments.

TROM monitors the appearance and the growth of crystals by using Polarized Optical Microscopy (POM). The sample is placed between crossed polarizers of the microscope. Crystalline materials are visible because they are birefringent. Amorphous materials or liquids, such as inks in their molten state, that do not transmit light, appear black under POM. Thus, POM provides an image contrast when viewing crystalline components and allows for pursuing crystallization kinetics of crystalline-amorphous inks when cooled from the molten state to a set-temperature. This phenomenon is exemplified in FIG. 1 for table salt (NaCl) crystals which appear very bright while the surrounding is black. Polarized optical microscopy (POM) enables exceptional image contrast when viewing crystalline components.

Figure 2:
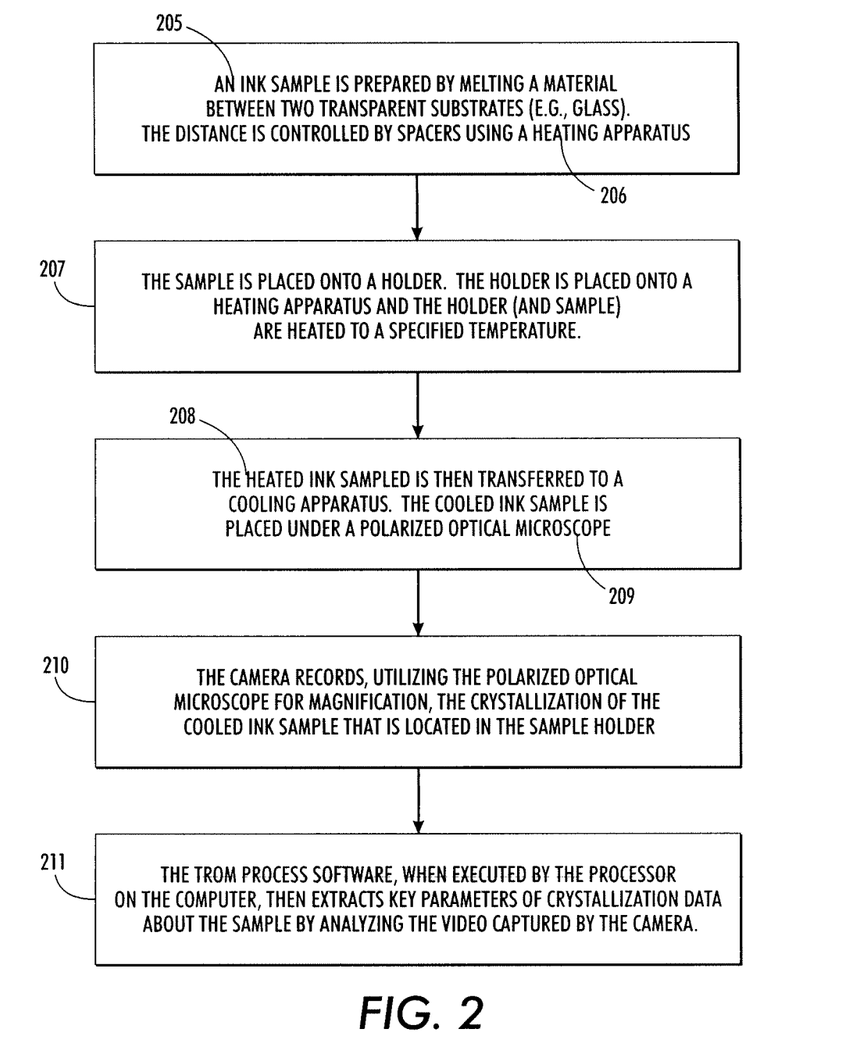
FIG. 2 illustrates a flowchart of the TROM process according to an embodiment of the invention.

In order to obtain data that allows comparison between different and various samples, standardized TROM experimental conditions were set, with the goal of including as many parameters relevant to the actual printing process. An ink sample is prepared by melting 205 a material (e.g., ink) using a heating apparatus. The melted ink or ink base is sandwiched 206 between 16-25 mm circular thin glass slides of a thickness of 0.2 mm to 0.5 mm. The thickness of the ink layer is kept at 5-25 μm (controlled with fiberglass spacers) which is close to actual printed ink layers. For rate of crystallization measurement, the sample is heated 207 to the expected jetting temperature (viscosity of about 10-12 cps) via an offline hotplate and then transferred to a cooling stage 208 coupled with an optical microscope. In an embodiment of the invention, the ink sample is placed 209 under the polarized optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments reported in this disclosure). Crystal formation and growth is recorded with a camera 210. For example, the camera system may be set to capture two minutes of video or images for the cooled ink sample located in the sample holder. The camera system records and monitors the appearance and time evolution of crystallization. The camera system generates a movie file or a series of images (e.g., captured images) which are transferred or transmitted to the computer and then stored in non-transitory storage medium. The TROM process software, when executed by a processor on the computer, then extracts 211 key parameters of crystallization data about the sample by analyzing the video captured by the camera system.

In embodiments, the key steps in the TROM process are illustrated in FIG. 2, highlighting the key steps in the measuring process with the mainline ink base which contains amorphous and crystalline components (no dye or pigment). When viewed under POM, in the molten state and at time zero, the crystalline-amorphous inks appear black as no light is passed through. As the sample crystallizes, the crystalline areas appear brighter. The numbers reported by TROM include: the time from the first crystal (crystallization onset) to the last crystal (crystallization completion).

The definition of key measured parameters of the TROM process are set forth below:

Time zero (T=0 s)=the molten sample is placed on the cooling stage under microscope T onset=the time when the first crystal appears T growth=the duration of the crystal growth from the first crystal (T onset) to the completion of the crystallization (T total)

T total=T onset+T growth

It should be understood that the crystallization times obtained with the TROM method for selected inks are not identical to what would be the crystallization times of a droplet of ink in an actual printing device. In an actual printing device such as a printer, the ink solidifies much faster. It is determined that there is a good correlation between the total crystallization time as measured by the TROM method and the solidification time of an ink in a printer. In the standardized conditions described above, it is also determined that inks which solidify within 20 seconds, within 15 seconds, or within 10 seconds (i.e., Total crystallization time<20 s, <15 s or <10 s), as measured by the TROM method, are suitable for fast printing, typically at speeds from 100 feet/minute or higher. Therefore, for the purpose of the present disclosure, a rate of crystallization lower than 15 seconds is considered to be fast crystallizing. However, very high speed printing in the order of 500 feet/minute or higher require inks with a crystallization rate as measured by TROM in the range of less than 7 seconds in the standardized TROM conditions.

In order to clearly compare the rate of crystallization of crystalline containing formulations and crystalline-amorphous mixtures formulations, the term Crystallization Ratio (CR) for the crystalline-amorphous formulation is defined as follows:

$$CR = T_{total}(\text{Crystalline and Amorphous Mixture}) / T_{total}(\text{Crystalline})$$

wherein $T_{total}$ (Crystalline and Amorphous Mixture) represents the total crystallization time for sample containing the mixture of a crystalline compound and an amorphous compound, and $T_{total}$ (Crystalline) represents the total crystallization time for a sample containing a crystalline compound alone.

It is expected that the crystallization time ($T_{total}$) of any given pure crystalline material will be shorter when compared to a mixture of the same crystalline material with an amorphous material. Without being bound by any theory, it is believed that the crystalline component, in a crystalline-amorphous mixture, crystallizes only when it is separated from the interaction with the amorphous molecules. As a result, the value of CR is expected to be higher than 1 for all crystalline-amorphous inks disclosed in the present embodiments.

A large value for CR indicates a slow crystallizing mixture, while a small value indicates a fast crystallizing mixture when compared to the crystallization time of the crystalline component alone. For example, if the crystalline material alone crystallizes in 3 seconds, i.e. $T_{total}$ (Crystalline)=3 s and the mixture of crystalline and amorphous crystallizes in 30 seconds in the same experimental TROM measuring conditions, i.e. $T_{total}$ (Crystalline and Amorphous) 30 s, this results in a Crystallization Ratio of the mixture CR=30/3=10. If for example, $T_{total}$ (Crystalline)=20 s and $T_{total}$ (Crystalline and Amorphous)=60 s, this results in a CR=60/20=3. As defined, the CR calculates the effect over the crystallization rate of the crystalline component when mixed with a given amorphous.

In practice, a CR<5 indicates a fast crystallizing crystalline-amorphous formulation, which crystallizes fast with respect to the crystalline component alone. A CR>5 indicates a slow crystallizing crystalline-amorphous formulation, which crystallizes slow with respect to the crystalline component alone.

In practice, we have found that inks with $T_{total}$ (Crystalline and Amorphous) lower or equal to 15 seconds in the TROM test are suitable for fast printing at speeds of about 100 feet per minute or higher. In other words, inks meeting this requirement solidify at a faster rate than the printing rate or speed. This translates into a CR=5 for a crystalline which crystallizes in 3 s, i.e. $T_{total}$ (Crystalline).

In certain embodiments, the total crystallization time of the phase change ink is no more than 5 times the total crystallization time of the crystalline compound alone. In further embodiments, the total crystallization time of the phase change ink is no more than 4 times the total crystallization time of the crystalline compound alone. In yet further embodiments, the total crystallization time of the phase change ink is no more than 3 times the total crystallization time of the crystalline compound alone.

The incorporation of one or more organic pigments as nucleating agents has also demonstrated to provide fast crystallization. Without being by bound by any theory, it is believed that the organic pigment acts as a nucleation and growth center for the crystalline compound, therefore accelerating its separation from the amorphous compound. Accelerated phase separation results in accelerated crystallization. Such organic pigments can generally include cyan, magenta, yellow and black organic pigments.

In further embodiments, including the organic pigments in the crystalline-amorphous ink compositions provides a synergistic effect. By combining the concept of limited compatibility and pigment addition together to create the present ink compositions results in ink compositions that are capable of even faster crystallization than those using either concept alone.

The Amorphous Compound

In embodiments, the amorphous compound is comprises a first ester of tartaric acid of Formula I or a first ester of citric acid of Formula II Formula I Formula II wherein each $R_1$, $R_2$, $R_3$, $R_4$ and $R_5$ is independently an alkyl group, wherein the alkyl can be straight, branched or cyclic, saturated or unsaturated, substituted or unsubstituted, having from about 1 to about 16 carbon atoms. In certain embodiments, each $R_1$, $R_2$, $R_3$, $R_4$ and $R_5$ is independently a cyclohexyl group optionally substituted with one or more alkyl groups selected from methyl, ethyl, n-propyl, isopropyl, n-butyl and t-butyl. In certain embodiments, $R_1$, $R_2$, $R_3$, $R_4$ and $R_5$ are each 2-isopropyl-5-methylcyclohexyl. In certain embodiments, the amorphous compound is an ester of citric acid of Formula II.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

In particular, di-DL-menthyl L-tartrate (DMT) was found to be especially suitable for use as an amorphous compound in the present ink embodiments.

Suitable citric acid esters for the amorphous component of the ink are, for example, disclosed in disclosed in U.S. patent application Ser. No. 13/095,795, which is hereby incorporated by reference in its entirety. In that application, an amorphous tri-DL-menthyl citrate (TMC) was tested and demonstrated robust printing on a coated substrate. TMC is a desirable amorphous candidate which affords suitable thermal and rheological properties as well imparts robustness to the print images.

The amorphous compounds are synthesized by an esterification reaction of tartaric acid.

In embodiments, the amorphous compound may comprise a diurethane compound having a formula of:

Formula III wherein Z is selected from the group consisting of:

and; and wherein Z can be attached to either side of the nitrogen atom of the diurethane formula through the bond labeled with *; each $R_6$ and $R_7$ is i) an alkyl group wherein the alkyl can be linear or branched having from about 1 to about 8 carbon atoms, or ii) an aryl group; with the proviso that when Z is —$(CH_2)_6$—, both $R_6$ and $R_7$ are not benzyl.

Each $R_6$ and $R_7$ can be any linear or branched alkyl including methyl, ethyl, propyl, (n-, iso-, sec- and t-) butyl, (n-, iso-, t- and the like) pentyl, (n-, iso-, t- and the like) hexyl, (n-, iso-, t- and the like) heptyl, or (n-, iso-, t- and the like) octyl.

In certain embodiments, $R_6$ and $R_7$ is independently selected from the group consisting of:

In certain embodiments, z is —$(CH_2)_6$— and both $R_6$ and $R_7$ are

These materials show relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

In embodiments, the amorphous compounds are formulated with a crystalline compound to form a solid ink composition. The ink compositions show good rheological profiles. Print samples created by the solid ink composition on coated paper by K-proof exhibit excellent robustness. Furthermore, using tartaric acid as an ester base has additional advantages of being low cost, and being obtained from a potential bio-derived ("green") source.

In embodiments, the solid ink composition is obtained by using novel amorphous compounds synthesized from tartaric acid and at least one alcohol in an esterification reaction. The solid ink composition comprises the amorphous compound in combination with a crystalline compound and a colorant. The present embodiments comprise a balance of amorphous and crystalline compounds to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present esters of tartaric acid, which provide amorphous compounds for the solid inks, have been discovered to produce robust inks having desirable rheological profiles and that meet the many requirements for inkjet printing.

In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound

In embodiments, the crystalline compound is one comprising a crystalline core moiety having at least one functional group and being attached to at least one crystalline terminal group, wherein the crystalline terminal group comprises an aromatic group, and wherein no one functional group in the amorphous core moiety is the same as any of the functional group of the crystalline core moiety.

In particular, The crystalline materials show sharp crystallization, relatively low viscosity (≤$10^1$ centipoise (cps), or from about 0.5 to about 20 cps, or from about 1 to about 15 cps) at a temperature of about 140° C., but very high viscosity (>$10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The ΔT between $T_{melt}$ and $T_{crys}$ is less than about 55° C.

In embodiments, the crystalline material is present an amount of from about 60 percent to about 95 percent by weight, or from about 65 percent to about 95 percent by weight, or from about 70 percent to about 90 percent by weight of the total weight of the ink composition.

The crystalline component may comprise amide, aromatic ester, linear diester, urethanes, sulfones, or mixtures thereof.

Suitable crystalline components include those disclosed in U.S. patent application Ser. No. 13/457,221 (not yet assigned) to Morimitsu et al., entitled "Phase Change Ink Comprising Crystalline Amides," which is hereby incorporated by reference in its entirety. These crystalline materials comprise the following structure:

Formula IV wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group wherein the substituent can be a linear, branched, cyclic or acyclic alkyl group and, wherein heteroatoms may optionally be present in the aromatic group, having from about 3 to about 40 carbon atoms, from about 6 to about 20 carbon atoms, or from about 6 to about 10 carbon atoms.

Suitable crystalline components include those disclosed in U.S. patent application Ser. No. 13/456,916 (not yet assigned) to Morimitsu et al., entitled "Phase Change Ink Compositions Comprising Aromatic Ethers," which is hereby incorporated by reference in its entirety. These crystalline materials comprise the following structure:

$$R_{10}\text{—}O\text{—}[(CH_2)_2O]_p\text{—}R_{11} \qquad \text{Formula V}$$

wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group wherein the substituent can be a linear, branched, cyclic or acyclic alkyl group and, wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of $R_{10}$ and $R_{11}$ is an aromatic group; and p is 0 or 1.

Non-limited examples of crystalline aromatic ether include and mixtures thereof.

Suitable crystalline components include those disclosed in U.S. patent application Ser. No. 13/095,555 to Chopra et al., entitled "Phase Change Inks and Methods of Making the Same, which is hereby incorporated by reference in its entirety. These crystalline materials comprise an ester of an aliphatic linear diacid having the following structure:

Formula VI wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components include those disclosed in U.S. patent application Ser. No. 13/456,619 to Chopra et al., entitled "Phase Change Ink Compositions Comprising Diurethanes and Derivatives Thereof," which is hereby incorporated by reference in its entirety. These crystalline materials comprise diurethanes having the following structure:

Formula VII wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is —$(CH_2)_n$— and n is 4 to 8. In certain of such embodiments, n is 6. In certain embodiments, each $R_{15}$ and $R_{16}$, is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components include those disclosed in U.S. patent application Ser. No. 13/457,323 to Morimitsu et al., entitled "Phase change ink Compositions Comprising Crystalline Sulfone Compounds and Derivatives Thereof" which is hereby incorporated by reference in its entirety. These crystalline component being a sulfone compound having the following structure:

Formula VIII wherein $R_{17}$ and $R_{15}$ can be the same or different, and wherein $R_{17}$ and $R_{15}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group wherein the substituent can be a linear, branched, cyclic or acyclic alkyl group and, wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_{17}$ and $R_{18}$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{13}$ is independently 2-hydroxyethyl, or cyanomethyl.

In certain embodiments, the crystalline component may include diphenyl sulfone, dimethyl sulfone, bis(4-hydroxyphenyl)sulfone, bis(4-aminophenyl)sulfone, bis(3-aminophenyl)sulfone, bis(4-chlorophenyl)sulfone, bis(4-fluorophenyl)sulfone, 2-hycroxyphenyl-4-hydroxyphenyl sulfone, phenyl-4-chlorophenyl sulfone, phenyl-2-aminophenyl sulfone, bis(3-amino-4-hydroxyphenyl)sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The alkyl group may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds of the invention may be designated as "$C_1$-$C_5$ alkyl" or similar designations. By way of example only, "$C_1$-$C_4$ alkyl" indicates that there are one to four carbon atoms in the alkyl chain, i.e., the alkyl chain is selected from the group consisting of methyl, ethyl, propyl, iso-propyl, n-butyl, isobutyl, sec-butyl, and t-butyl.

The alkyl group may be substituted or unsubstituted. When substituted, any group(s) besides hydrogen can be the substitutent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are in no way limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "halo" or, alternatively, "halogen" means fluoro, chloro, bromo or iodo.

In embodiments, the crystalline material is present an amount of from about 60 percent to about 95 percent by weight, or from about 65 percent to about 95 percent by weight, or from about 70 percent to about 90 percent by weight of the total weight of the ink composition.

In the present embodiments, the solid ink composition may also comprise the crystalline and amorphous material in combination with a colorant. The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the resulting ink compositions comprising a blend of the crystalline and amorphous compounds show good rheological profiles and that meet the many requirements for ink jet printing.

Organic Pigment

The ink composition of the present embodiments comprises an organic pigment. Organic pigments are also suitable colorants for the phase change inks. Examples of suitable organic pigments include but are not limited to Carbon Black, Pigment Blue 15, Pigment Blue 15:1, Pigment Blue 15:2, Pigment Blue 15:3, Pigment Blue 15:4, Pigment Blue 15:6, Pigment Blue 1, Pigment Blue 10, Pigment Blue 14, Pigment Blue 60, Pigment Blue 61, Pigment Yellow 1, Pigment Yellow 3, Pigment Yellow 12, Pigment Yellow 13, Pigment Yellow 14, Pigment Yellow 17, Pigment Yellow 24, Pigment Yellow 55, Pigment Yellow 62, Pigment Yellow 63, Pigment Yellow 65, Pigment Yellow 73, Pigment Yellow 74, Pigment Yellow 81, Pigment Yellow 83, Pigment Yellow 93, Pigment Yellow 95, Pigment Yellow 97, Pigment Yellow 110, Pigment Yellow 111, Pigment Yellow 123, Pigment Yellow 126, Pigment Yellow 127, Pigment Yellow 139, Pigment Yellow 147, Pigment Yellow 150, Pigment Yellow 151, Pigment Yellow 154, Pigment Yellow 155, Pigment Yellow 168, Pigment Yellow 170, Pigment Yellow 174, Pigment Yellow 175, Pigment Yellow 176, Pigment Yellow 179, Pigment Yellow 180, Pigment Yellow 183, Pigment Yellow 185, Pigment Yellow 188, Pigment Yellow 191, Pigment Yellow 194, Pigment Yellow 214, Pigment Red 2, Pigment Red 3, Pigment Red 4, Pigment Red 5, Pigment Red 8, Pigment Red 9, Pigment Red 12, Pigment Red 13, Pigment Red 21, Pigment Red 22, Pigment Red 23, Pigment Red 31, Pigment Red 32, Pigment Red 48:1, Pigment Red 48:2, Pigment Red 48:3, Pigment Red 48:4, Pigment Red 49:1, Pigment Red 49:2, Pigment Red 52:1, Pigment Red 52:2, Pigment Red 53:1, Pigment Red 53:3, Pigment Red 57:1, Pigment Red 63:1, Pigment Red 81, Pigment Red 112, Pigment Red 149, Pigment Red 166, Pigment Red 169, Pigment Red 170, Pigment Red 171, Pigment Red 175, Pigment Red 176, Pigment Red 177, Pigment Red 178, Pigment Red 179, Pigment Red 184, Pigment Red 185, Pigment Red 188, Pigment Red 189, Pigment Red 202, Pigment Red 208, Pigment Red 210, Pigment Red 224. Pigment Red 242, Pigment Red 245, Pigment Red 254, Pigment Red 266, Pigment Red 268, Pigment Red 269, Pigment Orange 5, Pigment Orange 13, Pigment Orange 16, Pigment Orange 34, Pigment Orange 36, Pigment Orange 63, Pigment Violet 1, Pigment Violet 2, Pigment Violet 3, Pigment Violet 19, Pigment Violet 23, Pigment Violet 27, Pigment Green 7, Pigment Green 36, all listed in the Color Index publication by the Society of Dyers and Colourists and the American Association of Textile Chemists and Colorists Specific examples of suitable commercially available organic pigments include, but are not limited to, PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. In one embodiment, the ink may contain one organic pigment. In another embodiment, the ink may contain a mixture of at least two different organic pigments.

In specific embodiments, the pigment is present in the ink composition in an amount of at least from about 0.1 percent to about 50 percent by weight, or at least from about 0.2 percent to about 20 percent by weight, from about 0.5 percent to about 10 percent, from about 1 percent to about 8 percent by weight of the total weight of the ink composition.

Typically the organic pigment particle suitable for use in according to the present disclosure have an average particle size of from 10 nm to 400 nm, more specifically a particle size of from 50 to 300 nm, or from 80 to 250 nm.

In some embodiments, the organic pigment is a cyan pigment such as pigment cyan Hostaperm Blue B4G from Clariantln other embodiments, the pigment is a yellow pigment such as pigment yellow 155, pigment yellow 180, or pigment yellow 139.

The phase change carrier compositions can be used in combination with conventional phase change ink dye colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN(Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); al. Disperse Yellow 238; Neptune Red Base NB543 (BASF, C.I. Solvent Red 49); Neopen Blue FF-4012 (BASF); Lampronol Black BR (C.I. Solvent Black 35) (ICI); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

The additional dye colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF), 2,2-bis (4-(2-(3,5-di-tert-butyl-4-hydroxyhydrocinnamoyloxy)) ethoxyphenyl)propane (TOPANOL-205, available from Vertullus), tris(4-tert-butyl-3-hydroxy-2,6-dimethyl benzyl) isocyanurate (Aldrich), 2,2'-ethylidene bis(4,6-di-tert-butylphenyl)fluoro phosphonite (ETHANOX-398, available from Albermarle Corporation), tetrakis(2,4-di-tert-butylphenyl)-4,4'-biphenyl diphosphonite (Aldrich), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethylaminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethylamino)-2-nitrosophenol (Aldrich), 2,6-dichloro-4-fluorophenol (Aldrich), 2,6-dibromo fluoro phenol (Aldrich), α-trifluoro-o-creso-1 (Aldrich), 2-bromo-4-fluorophenol (Aldrich), 4-fluorophenol (Aldrich), 4-chlorophenyl-2-chloro-1,1,2-trifluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis(trifluoromethyl)benzoic acid (Aldrich), ethyl-2-(4-(4-(trifluoromethyl)phenoxy)phenoxy)propionate (Aldrich), tetrakis(2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Pigment dispersions in the ink base may be stabilized by dispersants. Also, to enable dispersion of the pigments in the liquid vehicle, a dispersant or combination of dispersants may optionally be provided. Typically, dispersants may be used to stabilize particles in the ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like.

Thus, examples of suitable first functional groups that anchor the dispersant to the pigment particles include such functional groups as esters, amides, carboxylic acids, hydroxyl groups, anhydrides, urethanes, ureas, amines, amides, salt groups such as quaternary ammonium salts, and the like. The first functional groups anchor the dispersant to the colorant particles such that the dispersant is, for example, adsorbed, attached to, or grafted to the pigment particle. Likewise, examples of the second functional groups that are compatible with the ink vehicle include groups such as alkyl groups, which can be straight or branched, saturated or unsaturated, and the like. Examples of suitable dispersants that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -4340, -2025, -2035, -2040, -2021, -3600, -3232; SOLSPERSE 13240, 16000, 17000, 17940, 19000, 28000, 32500, 32000, 38500, 39000, 54000 (Lubrizol); and mixtures thereof. Individual dispersants or combinations may optionally be used with synergists including SOLSPERSE 5000, 12000, 22000 (Lubrizol); DISPERBYK-108, -163, -167, 182 (BYK-Chemie); and K-SPERSE 132, XD-A503, XD-A505 (King Industries).

The dispersant may be present in the solid ink in any effective amount, such as in amounts of from about 0.5% to about 40% by weight of the ink, such as from about 5% to about 25%, or from about 8% to about 13%.

In embodiments, in the molten state, the ink carriers for the phase change inks may have a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the solid ink has a viscosity of about >$10^6$ cps, at room temperature. In embodiments, the solid ink has a Tmelt of from about 65 to about 140° C., or from about 70 to about 140° C., from about 80 to about 135° C. and a Tcrys of from about 40 to about 140° C., or from about 45 to about 130° C., from about 50 to about 120° C., as determined by DSC at a rate of 10° C./min.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or ball mill apparatus or other high energy mixing equipment to affect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Ink Base 1 was prepared with Di-phenethyl L-tartrate (DPT) 80 g and Di-DL-menthyl L-tartrate (DMT) 20 g, in proportions as shown in Table 1. The mixture was stirred at 140° C. for 1 h before cooling to room temperature.

TABLE 1

| Ink Base | Crystalline Component | Amorphous Component |
|---|---|---|
| 1 |   DPT, 80% |   DMT, 20% |
| 2 |   Resin 80, 80% | |

Example 2

Ink Base 2 was prepared with dibenzyl hexane-1,6-diyldicarbamate (80 g) and DMT (20 g) in proportions as shown in Table 1. The mixture was stirred at 140° C. for 1 h before cooling to room temperature. The only difference between Ink Base 1 and 2 is the crystalline compounds.

Ink Crystallization

Ink Base 2 crystallizes three times as fast as Ink Base 1. The acceleration is attributed to a limited compatibility between dibenzyl hexane-1,6-diyldicarbamate and DMT which allows the crystalline material to crystallize from the molten solution faster.

Ink Sample 2 was made by combining and stirring SOLSPERSE 32000 (0.2 g, 2.0%), DPT (7.68 g, 76.8%) and DMT (1.92 g, 19.2%) at 140° C. for 30 minutes. B4G pigment (0.2 g, 2.0%) was added to the solution portion wise and the mixture was stirred for 2 hours at 140° C. before homogenizing at 13000 rpm for 20 minutes.

Ink Sample 4 was made by combining and stirring dibenzyl hexane-1,6-diyldicarbamate (3.92 g, 78.4%), DMT (0.98 g, 19.6%) and Solvent Blue 101 (0.1 g, 2.0%) at 140° C. for 1 hour.

Ink Sample 5 was made by combining and stirring SOLSPERSE 32000 (0.2 g, 2.0%), dibenzyl hexane-1,6-diyldicarbamate (7.68 g, 76.8%) and DMT (1.92 g, 19.2%) at 140° C. for 30 minutes. B4G pigment (0.2 g, 2.0%) was added to the solution portionwise and the mixture was stirred for 2 hours at 140° C. before homogenizing at 13000 rpm for 20 minutes.

Table 2 illustrates the TROM results for the different ink formulations of the present embodiments.

TABLE 2

| Ink Sample | Ink Base | Additive | Total Cryst time(s)* | Concept demonstrated |
|---|---|---|---|---|
| 1 | 1 | None | 21 | |
| 2 | 1 | B4G cyan (pigment), 2%; SOLSPERSE 32000, 2% | 14 | Additive pigments |
| 3 | 2 | None | 7 | Limited compatibility |
| 4 | 2 | Solvent Blue 101 (dye), 2% | 7 | Limited compatibility |
| 5 | 2 | B4G cyan (pigment), 2%; SOLSPERSE 32000, 2% | 4 | Limited compatibility + additive pigments |

*as determined by TROM

Ink Samples 1 and 2 illustrate that adding a pigment can increase the rate of crystallization. Most importantly, as shown by comparing Ink Samples 3 and 5, the concepts of limited compatibility and pigment addition together act synergistically to provide an ink which crystallizes faster than each of the individual approaches using crystalline/amorphous components having low compatibility or organic pigment.

Ink Characterization

Figure 3:
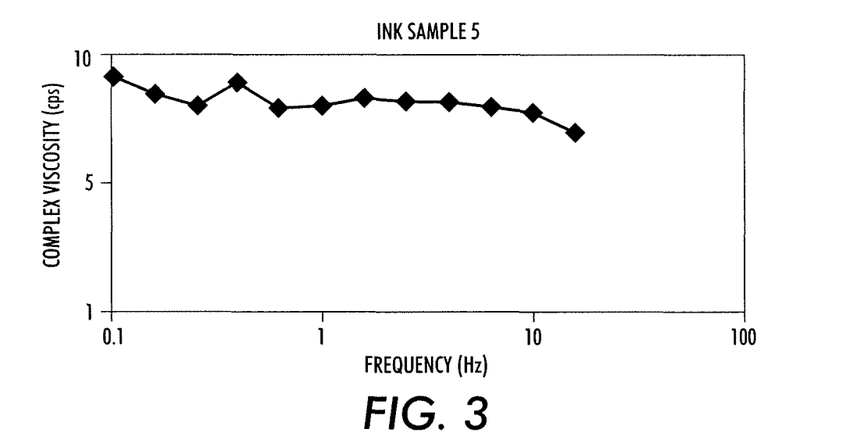
FIG. 3 is a graph illustrating rheology data of pigmented inks made according to the present; embodiments.
Figure 4:
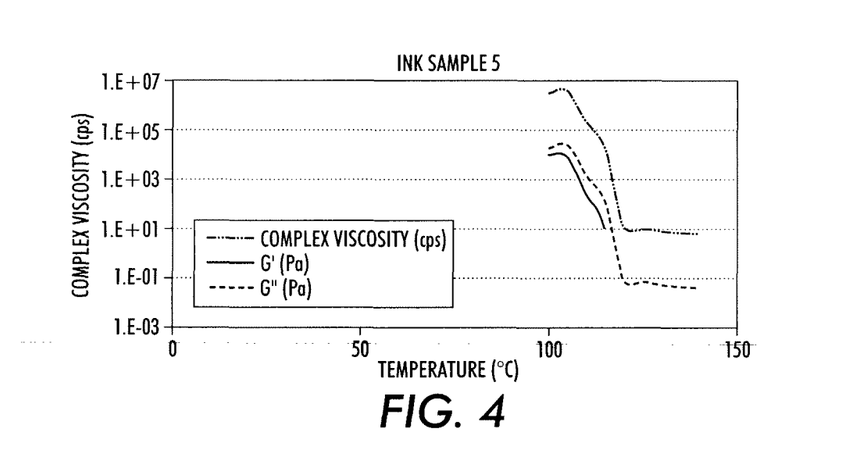
FIG. 4 is a graph illustrating viscosity data of ink base and pigmented inks made according to the present embodiments.

Rheology analysis of Ink Sample 5 showed that the ink exhibited Newtonian behavior at 140° C., as shown in FIG. 3, and was jettable (i.e., jetting viscosity~11 cps) at 125° C., as shown in FIG. 4.

Robustness Characterization

Ink Sample 5 was subsequently coated using a K-printing proofer (manufactured by RK Print Coat Instrument Ltd., Litlington, Royston, Heris, SG8 0OZ, U.K.) onto Xerox digital Color Elite Gloss, 120 gsm (DCEG) to form robust images that could not be easily removed from the substrate.

When a scratch/gouge finger with a curved tip at an angle of about 15° from vertical, with a weight of 528 g applied, was drawn across the images at a rate of approximately 13 mm/s no ink was visibly removed from the images. The scratch/gouge tip is similar to a lathe round nose cutting bit with radius of curvature of approximately 12 mm.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specifica-

What is claimed is:

1. A phase change ink comprising:
an amorphous compound selected from the group consisting of an ester of tartaric acid of Formula I:

Formula I wherein each $R_1$, $R_2$ is independently an alkyl group, wherein the alkyl can be straight, branched or cyclic, saturated or unsaturated, substituted or unsubstituted, having from about 1 to about 16 carbon atoms, and mixtures thereof;
a crystalline compound comprising a crystalline core moiety having at least one functional group and being attached to at least one crystalline terminal group, wherein the crystalline terminal group comprises an aromatic group;
an organic pigment; and
an optional dye colorant, wherein no one functional group in the amorphous core moiety is the same as any of the functional groups of the crystalline core moiety, thereby providing reduced compatibility between the amorphous core moiety and crystalline core moiety, wherein the reduced compatibility and presence of organic pigment provide synergism as a total crystallization time of the phase change ink being smaller than the crystallization time of the phase change ink without the organic pigment.

2. The phase change ink of claim 1, wherein a total crystallization time of the phase change ink is no more than 5 times a total crystallization time of the crystalline compound alone.

3. The phase change ink of claim 1, wherein the crystalline compound comprises sulfone having the following formula:

Formula III wherein each $R_{17}$ and $R_{18}$ independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms; and (iii) an aromatic group, which can be a substituted or unsubstituted aromatic group wherein the substituent can be a linear, branched, cyclic or acyclic alkyl group and, wherein heteroatoms may optionally be present in the aromatic group, having from about 3 to from about 40 carbon atoms; and mixtures thereof.

4. The phase change ink of claim 1, wherein the crystalline compound comprises amide having the following formula:

Formula IV wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms; and (iii) an aromatic group, which can be a substituted or unsubstituted aromatic group wherein the substituent can be a linear, branched, cyclic or acyclic alkyl group and, wherein heteroatoms may optionally be present in the aromatic group, having from about 3 to about 40 carbon atoms.

5. The phase change ink of claim 1, wherein the crystalline compound comprises aromatic ether having the following formula:

Formula V wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms; and (iii) an aromatic group, which can be a substituted or unsubstituted aromatic group, wherein heteroatoms may optionally be present in the aromatic group wherein the substituent can be a linear, branched, cyclic or acyclic alkyl group and, having from about 3 to about 40 carbon atoms; and mixtures thereof, provided that at least one of $R_{10}$ and $R_{11}$ is an aromatic group; and p is 0 or 1.

6. The phase change ink of claim 1, wherein the crystalline compound comprises diurethane having the following formula:

Formula VII wherein Q is alkanediyl; each $R_{15}$ and $R_{16}$ is independently phenyl or cyclohexyl optionally substituted with one or more alkyl; i is 0 or 1; j is 0 or 1; p is 1 to 4; and q is 1 to 4.

7. The phase change ink from claim 1, wherein the crystalline component comprises an ester of an aliphatic linear diacid having the following formula:

wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including
alkyl groups, wherein the alkyl portion can be straight, branched or cyclic.

8. The phase change ink of claim 1, wherein the crystalline compound is present in an amount of from about 60 percent to about 95 percent by weight of the total weight of the phase change ink.

9. The phase change ink of claim 1, wherein the amorphous compound is present in an amount of from about 5 percent to about 40 percent by weight of the total weight of the phase change ink.

10. The phase change ink of claim 1, wherein a weight ratio of the crystalline to amorphous compound is from about 65:35 to about 95:5.

11. The phase change ink of claim 1, wherein the organic pigment is selected from the group consisting of cyan, magenta, violet, green, scarlet, blue, red, orange, yellow, black, and mixtures thereof.

12. The phase change ink of claim 1, wherein the pigment is present in an amount of from about 0.1 percent to 10 percent by weight based on the entire the phase change ink.

13. The phase change ink of claim 1, wherein the pigment has an average particle size of from about 10 to about 200 nm.

14. The phase change ink of claim 1 having a viscosity of from about 5 to about 22 cps at a temperature of about 140° C.

15. The phase change ink of claim 1 having a viscosity of less than about 15 cps at a temperature of about 140° C.

16. The phase change ink of claim 1 having a viscosity of greater than about $10^6$ cps at room temperature.

17. The phase change ink of claim 1 further comprising a dispersant.

18. A phase change ink comprising:
an amorphous compound selected from the group consisting of an ester of tartaric acid of Formula I:

Formula I wherein each $R_1$, $R_2$ is independently an alkyl group, wherein the alkyl can be straight, branched or cyclic, saturated or unsaturated, substituted or unsubstituted, having from about 1 to about 16 carbon atoms, and mixtures thereof;
a crystalline compound comprises a crystalline core moiety having at least one functional group and being attached to at least one crystalline terminal group, wherein no one functional group is —OH; and
an organic pigment, wherein the total crystallization time of the phase change ink is no longer than about 5 times that the total crystallization time of the crystalline compound alone.

* * * * *